Dec. 19, 1939.　　　　F. P. DUNN　　　　2,183,990
COUPLING APPARATUS
Filed Oct. 29, 1937　　　2 Sheets-Sheet 1

Inventor
Fred P. Dunn.

Attorney.

Dec. 19, 1939.  F. P. DUNN  2,183,990
COUPLING APPARATUS
Filed Oct. 29, 1937   2 Sheets-Sheet 2

Inventor
Fred P. Dunn.

Attorney.

Patented Dec. 19, 1939

2,183,990

UNITED STATES PATENT OFFICE 2,183,990

COUPLING APPARATUS

Fred P. Dunn, Glendale, Calif., assignor to Utility Trailer Manufacturing Company, Los Angeles, Calif., a corporation of California Application October 29, 1937, Serial No. 171,742

9 Claims. (Cl. 280—33.15)

This invention has to do with coupling apparatus for attaching one mobile vehicle to another; and although the invention is useful in the coupling of various types of vehicles, such as railway cars, etc., it has been at present designed particularly for coupling automobile trucks and trailers, and so will be described in that use, but without limitation thereto.

It is a general object of the invention to make and provide a tight coupling between coupled vehicles. As ordinarily coupled, and as ordinarily operated, vehicles are only loosely coupled together. That is true of the usual type of railroad car coupling and is also true of the pintle hook and eye type of coupling such as is used commonly between trucks and trailers. Looseness of fit in all such couplings is a necessary or desirable concomitant of cheapness of manufacture and ease of coupling and uncoupling operations. But there are many objections to, and arising from, the looseness in such a coupling. In starting or stopping the slack is taken up with accompanying clash and jar, and the same thing is true whenever the vehicles change from draft tension to coasting compression on the coupling. However, an action even more objectionable, because of its constant occurrence, takes place during ordinarily driving on average roads. The slight undulations and road roughnesses cause the coupled vehicles to move relatively back and forth, with an accompanying constant hammering at the coupling.

The hammering which takes place at the coupling tends, of course, to deform the coupling members and to increase the amount of loose play; and if the coupling members are not renewed from time to time, the hammering action shears rivets and pins, breaks welds, and crystallizes and breaks the parts of the coupling apparatus. In addition to that, the constant hammer, transmitted through the truck to the driver's seat, has a very marked tendency to bring on driver fatigue.

My invention obviates all these difficulties by providing a simple and inexpensive, but efficient, arrangement for taking up the looseness in such a coupling apparatus. And my invention is of such a nature that it does not require the coupling parts to be made initially to fit tightly, and therefore preserves the manufacturing and economic advantage of the loose fit. Applied to any such loose fitting coupler, wherein typically there are two coupling parts which fit loosely together, my invention provides a means whereby a pressure, preferably a yielding pressure, is maintained between the two interengaging coupling members. The pressure is exerted between the two members in a longitudinal direction to prevent relative longitudinal movement of the coupled vehicles. And the yielding pressure will preferably be somewhat less than the maximum longitudinal force between the vehicles; the pressure preferably being such as to prevent relative coupler movement under the forces ordinarily and constantly generated in ordinary road travel, but insufficient to induce excessive frictional wear between the coupler parts. For instance, in a heavy truck and trailer combination, the maximum forward force generated by the trailer running up on the truck in quick stopping, may be as much as five to ten thousand pounds, or so. In such a situation I have found that a yielding pressure of 500 to 1000 pounds between the members of the coupling is sufficient to prevent all the movement and hammering action that is due to ordinary operation on average roads, or due to average changes in acceleration or deceleration.

As I have stated, the invention is generally applicable to couplings of various types and kinds, and in connection with various types of vehicles; subject merely to variations in design to suit varying types and sizes of couplings. It is however particularly useful in the coupling of trucks and trailers, and will therefore be so described. In practical use in connection with that type of vehicle, the invention has some particular practical utilities in addition to those stated. Truck and trailer couplers are not as thoroughly standardized as, for instance, railroad couplers; and my invention makes it more or less immaterial how closely or how loosely the un-standardized coupling elements may fit together. And also my invention has particular utility where the trailer draw bar is not equipped with a shock absorbing spring; in fact, it makes it practicable to eliminate the spring from the trailer draw bar.

In the usual and most ordinary types of truck and trailer coupler there is a pintle hook element which is mounted on one vehicle, usually the truck; and an eye element which is usually mounted on the draw bar of the trailer. In order to apply the preferably yielding pressure between these two interengaged elements, I mount a pressure-applying member on one or the other of those elements. The usual structure of the hook elements provides space and facilities for mounting the presure member upon that element, and so I prefer to mount it there, in such a position that it may exert the desired pressure against the eye element to hold it in engagement with the hook.

Various means may be used for exerting the requisite pressure upon the pressure member, and, through it, upon the eye. In the following description I describe devices in the preferred arrangement referred to above and I also describe various forms and arrangements of pressure-applying means. I describe these preferred forms in particular and detail, not as a limitation upon the invention, but in order that the preferred form may thoroughly and completely be understood by those skilled in the art. And for that purpose I refer to the accompanying drawings, in which such preferred forms and arrangements are illustrated, and in which:

Figure 1:
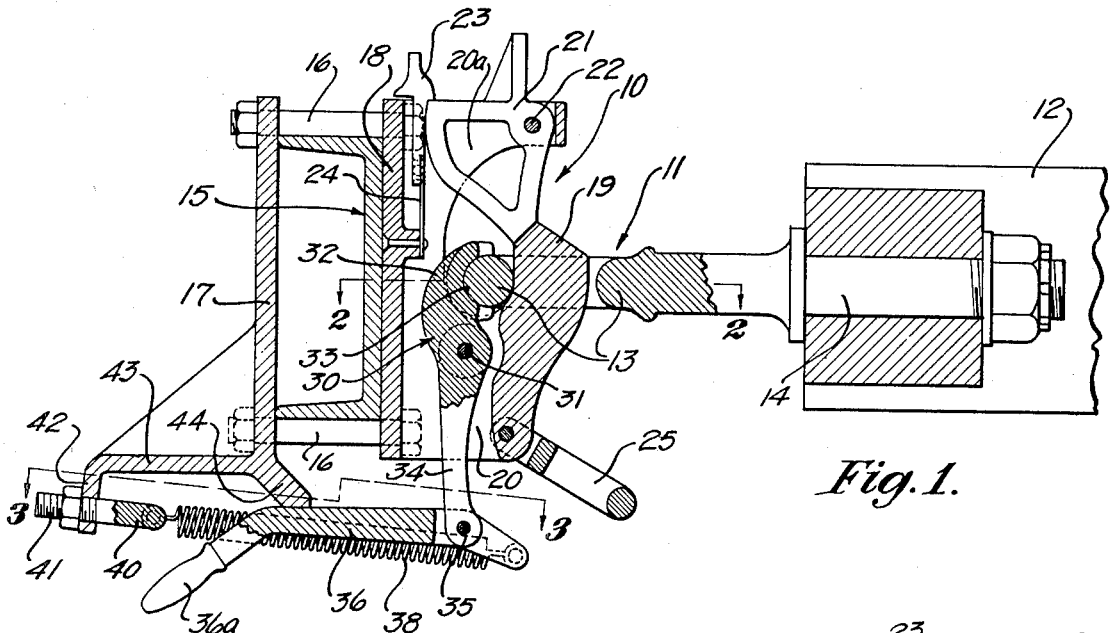
Fig. 1 is a longitudinal section, in a vertical plane, showing a coupler of the described type, equipped with one form of my invention.

In the drawings the numeral 10 designates generally the pintle hook element of the coupler, and the numeral 11 designates generally the eye element of the coupler mounted on the end of the draw bar 12. In the present illustration the eye element comprises the eye 13 mounted on the bolt or bar 14 which is shown as being directly secured to the draw bar 12 without the intervention of a shock absorbing spring. The draw bar, as I have stated may or may not be equipped with a shock absorbing spring, but the spring is not necessary where my invention is used.

The pintle hook element of the coupler is here shown of the standard type which is usually mounted on a rear frame member of the truck or towing vehicle. For instance a rear transverse frame member is shown at 15, and the hook element is secured to that frame member by bolts 16 and a clamping plate 17, which may be considered as a part of the hook element. The pintle hook element as here shown, comprises a base plate 18 which carries the hook member 19 in a position spaced out rearwardly from its rear face; the hook 19 being joined to the base member 18 by a connecting structure including a pair of spaced ribs 20. These spaced ribs form a sort of hollow structure between the hook 19 and base plate 18, and the ribs are extended upwardly as shown at 20a in Fig. 1 to form a convenient mounting for the latch member 21. The ribs at 20a extend outwardly over the upper end of hook 19, with space enough between 19 and 20a for the insertion and removal of eye 13. The latch 21 is pivoted at 22 on the ribs 20a and may be thrown upwardly and forwardly from the position shown in Fig. 1 so as to open the space for insertion or removal of the eye. With the eye in place, as shown in Fig. 1, the latch 21 closes the space between 19 and 20a, and the latch is then locked in position by a latch head 23 mounted on the upper end of a spring 24. A link or ring 25 provides means for attaching a chain which is coupled to the trailer as an emergency connection.

All the structure so far described is typical of the type of coupler in most common use. As stated before, it is usually the case, and for certain reasons is desirable, that the eye 13 fit the hook 19 loosely. That loose fit not only makes for economy of construction and ease of manipulation, but also provides that the eye 13 may have universal movement in all directions about the hook so that relative freedom of movement between a truck and trailer is not interferred with and no unnecessary strains are put upon the coupling.

Figure 2:
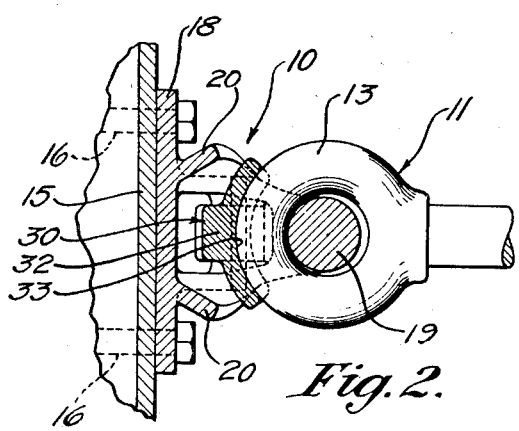
Fig. 2 is a horizontal detail section taken on line 2—2 of Fig. 1.
Figure 3:
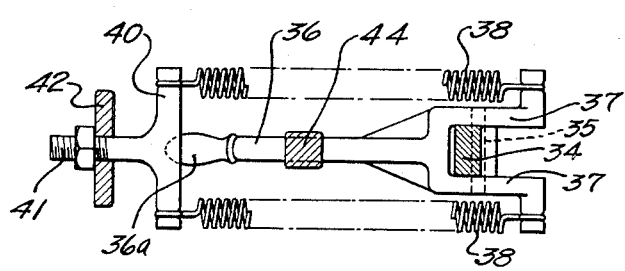
Fig. 3 is a horizontal detail section taken on line 3—3 of Fig. 1.

In the form of my invention shown in Figs. 1, 2 and 3, a pressure member 30 is pivoted at 31 on a pivot pin which is mounted upon and extends between the spaced ribs 20. The pressure member occupies a position between the ribs and between the hook 19 and base plate 18. Its upper end 32 above pivot 31 is preferably formed as shown in Figs. 1 and 2, with an eye engaging surface 33 which is concavely curved in both a vertical and a horizontal direction, to more or less accurately fit the exterior contour of eye 13. Below pivot 31 the pressure member 30 has a depending arm 34 which at its lower end carries a pivot pin 35 on which a pivoted handle arm 36 is carried. This handle arm, in the normal applied position shown in Fig. 1, extends forwardly from pivot 35, the handle 36a being bent down slightly to a convenient position for manual engagement. At the pivot 35 this handle arm is bifurcated into two arms 37 which extend rearward of pivot 35 and these ends of two springs 38 are connected to the forward ends of these two arms. These two springs, which are here shown as tension springs, have their other ends attached to a cross head 40 mounted upon an adjustment bolt 41 which in turn is mounted in a depending lug 42 carried by a stationary bracket 43 which is conveniently carried by and made a part of the clamping plate 17. The arms 37 of the handle arm 36 preferably extend somewhat downwardly when the handle arm is in the position of Fig. 1, so that the springs 38, pulling in an "over-center" position, tend to throw the handle arm 36 up against a stop 44 which may also be conveniently formed on the clamping plate 17.

In the position of the parts shown in Fig. 1, the springs 38 pull to the left, or forwardly, on the lower end of arm 34, and thus press the upper end 32 of the pressure member rearwardly against the eye 13 and press that eye back against the hook 19 to hold the eye in yielding engagement with the hook. The pressure of this yielding engagement depends upon the effective strengths of springs 38 and upon the relative lengths of leverage arms involved in the system, as will be readily understood. In general, I preferably do not intend that the total rearward pressure on the eye be as great as the greatest forward forces which may at times tend to move the eye forward on the hook 19. In practice, I find it sufficient and preferable that the rearward pressure on the eye be but a fraction of that maximum force; say 500 to 1000 pounds where the maximum forward force on the eye may possibly be as much as 5000 to 10,000 pounds.

With such an arrangement, and proportion of pressures, the action of the device is as follows:

Under normal conditions the pressure exerted rearwardly by pressure member 30 holds the eye 13 back against hook 19 under a pressure of the determined amount. This pressure is not large enough to cause excessive frictional wear of the eye or hook, and also does not materially interfere with the free universal movement of the eye with relation to the hook. Under normal conditions of road and driving the forces tending to move the eye forward relative to the hook are not sufficient to press the pressure member forward, and thus do not disengage the eye from the hook. Thus, under normal and ordinary driving conditions the eye remains in close contact with the hook and all hammering and jarring are eliminated. On the relatively few occasions when a much greater forward force is transmitted by the eye, the eye will press the member 30 forward. But under those conditions the member 30, with its yielding pressure support supplied by the springs, acts as a shock absorber; and either entirely absorbs the shock and jar or eases off any shock resulting from the rearward face of the eye moving up forcibly into contact with the rearward face of the hook.

Figure 4:
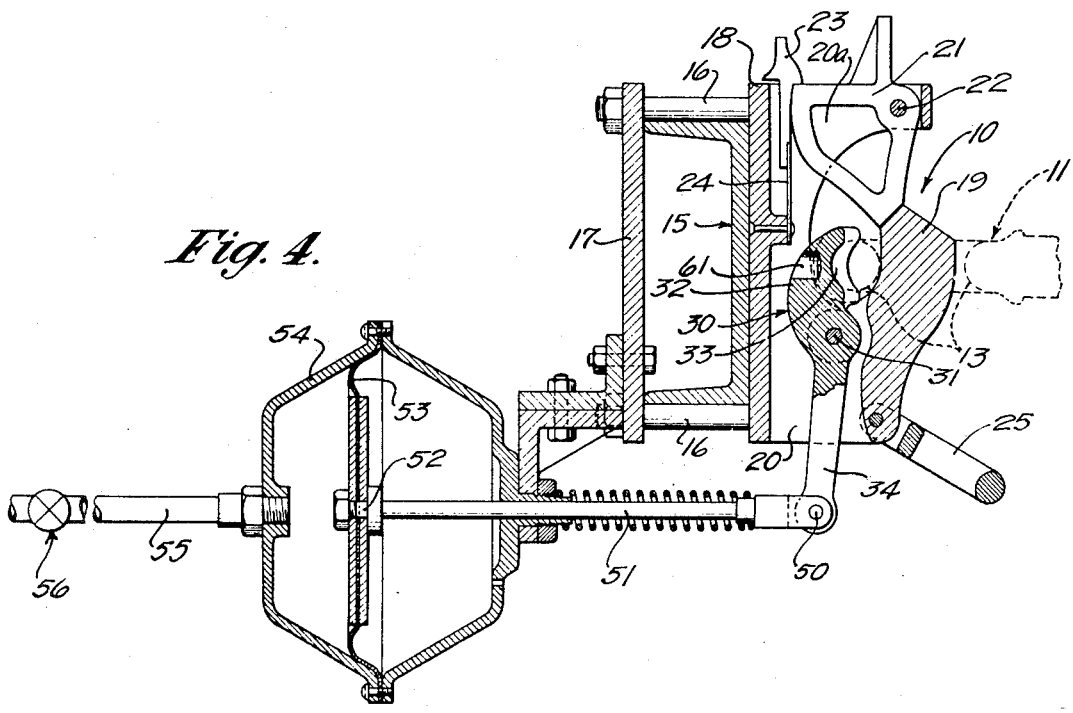
Fig. 4 is a view similar to Fig. 1 and showing a vacuum actuated type of the invention.

Fig. 4 shows a structure similar in all respects to that shown in Figs. 1 to 3, except in the particulars now to be described. The same numerals are applied to Fig. 4 insofar as they are applicable.

In Fig. 4 the lower end of arm 34 is connected at pin 50 with a rod 51 whose end is connected at 52 to a vacuum pressure actuated member, here shown as a diaphragm 53 in chamber 54. A pipe 55 and valve 56 indicate a means for controllably applying suction to the left hand side of the diaphragm. The suction for this purpose may conveniently be had from the commonly used vacuum brake systems. Application of suction at predetermined pressure, to a diaphragm of predetermined area, applies the desired yielding force to the arm 34 of the pressure member 30. The operation of the form shown in Fig. 4 is thus the same as in Fig. 1, except that the source of the pressure, and the particular method of its control is different. In Fig. 4 the pressure is controlled by any suitable valvular means. In Fig. 1 the application of pressure to the pressure member 30 is controlled manually by manipulating the handle 36a. By throwing that handle down, the handle arm 37 is thrown upwardly and over center so that the tension of the springs 38 is released. This releases the pressure on arm 34 of pressure member 30, and when pressure is thus released the upper end of the pressure member may be freely moved away from the eye and, the latch 21 having been elevated, the eye may be removed from or inserted upon the hook. In Fig. 4, when the suction is released, the pressure member 30 is similarly loose.

Figure 5:
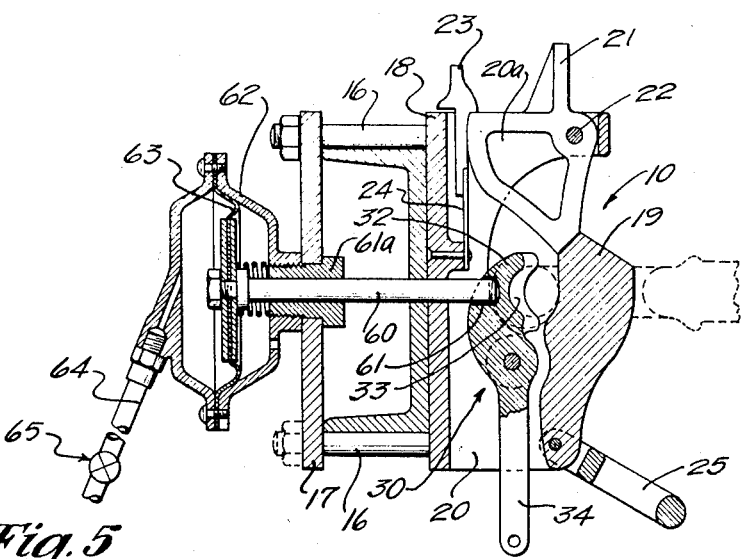
Fig. 5 is a similar view showing a fluid pressure actuated type of the invention.

In Fig. 5 the pressure member 30 is supplied with a pressure force acting through a push rod 60 which may conveniently be seated in a recess 61 in the back face of the upper end 32 of the pressure member. The pressure member here is shown as equipped with a depending arm 34; and the pressure member in Fig. 4 is shown as equipped with the recess 61. In making up the parts for my device I find it convenient and economical to make the pressure member 30 in such form as to be adaptable to any of the modified pressure applying systems. Supplied to the trade in that manner, the device may then be connected up with either the spring pressure arrangement of Fig. 1 or with either of the air pressure systems of Figs. 4 and 5.

In Fig. 5 the push rod 60 is shown as extending through a bearing sleeve 61a and into a diaphragm chamber 62 which encloses the diaphragm 63. A valve controlled pipe 64 supplies fluid under pressure to the left hand face of the diaphragm. Valve 65 typifies any suitable valvular control. By applying suitable pressure to a diaphragm of suitable size the required yielding pressure is here again applied to the upper end of the pressure member 30. The action and operation of the device of Fig. 5 is the same as that before described.

Figure 6:
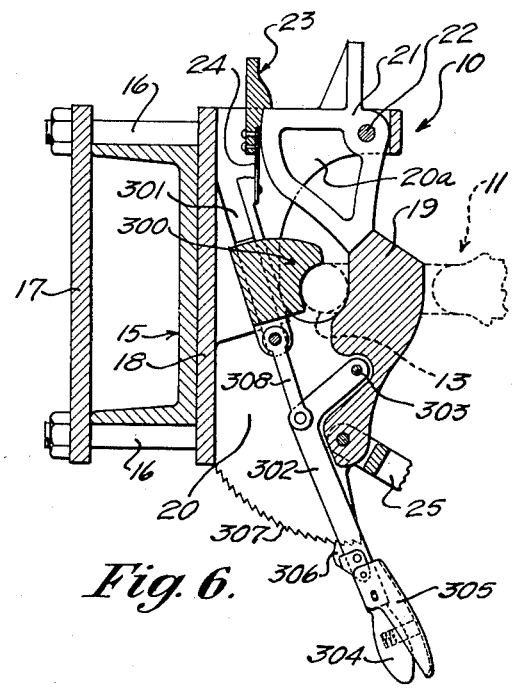
Fig. 6 is a similar view showing a modification of the invention wherein a positive rather than a yielding pressure is used.

In Fig. 6 the pintle hook element 10 is shown substantially the same as before, as also the eye element 11. Here, however, the pressure member 300 is in the form of a block which slides in diagonal ways 301 and is drawn diagonally downwardly and rearwardly to engage the eye 13 and to hold it in pressurable contact with the hook 19. Although any suitable means may be used for forcibly moving the pressure block down and into contact with the eye, I have preferred here to show a positive means of moving the pressure block and thus exerting a positive pressure on the eye. Such a means may comprise a bent lever 302 pivoted at 303 and having on its lower end a handle 304 and a ratchet handle 305 that controls a pawl 306 which engages in the ratchet sector 307 that is formed as a part of one of the ribs 20 of the hook element. A link 308 connects the lever 302 with the pressure member 300. By swinging handle 304 toward the right in Fig. 6 the pressure member is moved down, and the pressure which it exerts on the eye 13 depends on the wedging angle of ways 301, the leverage proportions of the lever system, and on the force which is manually exerted on handle 304 when it is set in position on the ratchet. In this form of device the eye (within the elastic compressibilities of the materials of the parts) is held at all times solidly in contact with the hook. Assuming that the materials are not compressible to any substantial degree under the forces to which they are subjected, then it is only necessary to set the pressure block 300 against the eye with a comparatively light pressure in order to hold the eye at all times in contact with the hook.

I have described several variant forms of my invention in full detail, but merely as illustrations of the invention, and not as limitations thereon. The invention itself is not to be considered as limited except as expressly so stated in the following claims.

I claim:

1. In combination, a vehicle draft coupler for connecting a leading vehicle and a trailing vehicle that embodies two engageable and disengageable coupler members fitting each other with loose play in the line of draft, a pressure applying member mounted on one of the coupler members and having movement thereon in the direction of the line of draft, and adapted to engage the other said member by movement in said direction, a pressure applying spring which is ineffective until the coupler members are in coupled relation, and manually actuatable means operative after the coupler members are in coupled relation for applying the spring pressure to the pressure applying member to move it in said direction and thereby to engage it with said other member with a force sufficient to prevent play between the coupler members in the direction of the line of draft under normal running conditions.

2. In combination, a vehicle draft coupler for connecting a leading vehicle and a trailing vehicle that embodies two engageable and disengageable coupler members fitting each other with loose play in the line of draft, a pressure applying lever pivoted on one of said members and adapted by virtue of its pivotal movement in one direction to engage the other of said members, a spring mounted at one end on the first mentioned coupler member, and manually actuatable means for stressing said spring and applying the spring stress to said lever in a manner tending to move it pivotally in said one direction and thereby to engage it with said other member with a force sufficient to prevent play between the coupler members in the direction of the line of draft under normal running conditions.

3. In combination, a vehicle draft coupler that embodies a pintle hook member and an eye member engageable and disengageable therewith, the eye fitting the pintle hook with loose play in the line of draft, a pressure applying lever pivotally mounted between its ends on the pintle hook member, one end of said lever having movement toward and adapted to engage the eye, a spring adjustably mounted at one end on the pintle hook member, and manually actuatable means for stressing said spring and applying the spring stress to the other end of said lever.

4. In combination, a draft coupling between a leading vehicle and a trailing vehicle embodying two engageable and disengageable coupler members, one on each of the vehicles, said members under given conditions of engagement having a capacity for relative movement in the direction of the line of draft whereby limited over-running movement of the trailer is possible, pressure means movable from inactive relation into active relation with the coupler members after the members are in coupled relationship, said pressure means being in inactive relation while the coupling members are being coupled and, when in active relation, being adapted to hold said members against such relative movement with an effective force preventing trailer-over-run under normal running conditions, and means for moving the pressure means into active pressure-applying relation after the coupler elements are engaged in coupled relationship.

5. In combination, a draft coupling between a leading vehicle and a trailing vehicle embodying two engageable and disengageable coupler members, one on each of the vehicles, said members under given conditions of engagement having a capacity for relative movement in the direction of the line of draft whereby limited over-running movement of the trailer is possible, yielding pressure means movable from inactive relation into active relation with the coupler members after the members are in coupled relationship, said pressure means being in inactive relation while the coupling members are being coupled and, when in active relation, being adapted yieldingly to hold said members against such relative movement with an effective force preventing trailer-over-run under normal running conditions, and means for moving the pressure means into active pressure-applying relation after the coupler elements are engaged in coupled relationship.

6. In combination, a draft coupling between a leading vehicle and a trailing vehicle embodying two engageable and disengageable coupler members, one on each of the vehicles, said members under given conditions of engagement having a capacity for relative movement in the direction of the line of draft whereby limited over-running movement of the trailer is possible, a pressure member movable into and out of active relation with the coupler members after the coupler members are in coupling relationship, said pressure member when in active relation being adapted to hold the coupling members against such relative movement with an effective force preventing trailer-over-run under normal running conditions, means adapted to hold the pressure member out of active relation while the coupling members are being coupled, and means for moving the pressure member into active pressure-applying relation after the coupler elements are engaged in coupling relationship.

7. In combination, a draft coupling between a leading vehicle and a trailing vehicle embodying two engageable and disengageable coupler members, one on each of the vehicles, said members under given conditions of engagement having a capacity for relative movement in the direction of the line of draft whereby limited over-running movement of the trailer is possible, a pressure member movable into and out of active relation with the coupler members after the coupler members are in coupling relationship, said pressure member when in active relation being adapted to hold the coupling members against such relative movement with an effective force preventing trailer-over-run under normal running conditions, fluid-pressure means for moving the pressure member into active relation after the coupler members are engaged in coupling relationship, and means for controlling the fluid pressure.

8. In combination, a draft coupling between a leading vehicle and a trailing vehicle embodying two engageable and disengageable coupler members, one on each of the vehicles, said members under given conditions of engagement having a capacity for relative movement in the direction of the line of draft whereby limited over-running movement of the trailer is possible, a pressure member movable into and out of active relation with the coupler members after the coupler members are in coupling relationship, said pressure member when in active relation being adapted to hold the coupling members against such relative movement with an effective force preventing trailer-over-run under normal running conditions, fluid-pressure means for moving the pressure member into and holding it in active relation after the coupler members are engaged in coupling relationship, and means for controlling the fluid pressure.

9. In combination, a draft coupling between a leading vehicle and a trailing vehicle embodying two engageable and disengageable coupler members, one on each of the vehicles, said members under given conditions of engagement having a capacity for relative movement in the direction of the line of draft whereby limited over-running movement of the trailer is possible, pressure means movable from inactive relation into active relation with the coupler members after the members are in coupled relationship, said pressure means being in inactive relation while the coupling members are being coupled and, when in active relation, being adapted to hold said members against such relative movement with an effective force preventing trailer-over-run under normal running conditions, and means for moving the pressure means into and out of active pressure-applying relation after the coupler elements are engaged in coupled relationship.

FRED P. DUNN.